United States Patent [19]

Morton

[11] 4,178,565

[45] Dec. 11, 1979

[54] FLUID LASER FLOW CHANNEL LINER

[75] Inventor: Richard G. Morton, North Reading, Mass.

[73] Assignee: Jersey Nuclear-Avco Isotopes, Inc., Bellevue, Wash.

[21] Appl. No.: 852,224

[22] Filed: Nov. 17, 1977

[51] Int. Cl.[2] .............................................. H01S 3/02
[52] U.S. Cl. ........................... 331/94.5 D; 331/94.5 L
[58] Field of Search ..................... 331/94.5 D, 94.5 L; 330/4.3

[56] References Cited

U.S. PATENT DOCUMENTS

| | | | |
|---|---|---|---|
| 3,477,037 | 11/1969 | Seitz | 331/94.5 L |
| 3,740,665 | 6/1973 | Itzkan | 331/94.5 L |
| 3,805,187 | 4/1974 | Lempicki et al. | 331/94.5 L |
| 3,872,403 | 3/1975 | Pilloff | 331/94.5 L |
| 3,992,684 | 11/1976 | Patrick et al. | 331/94.5 L |

*Primary Examiner*—William L. Sikes
*Attorney, Agent, or Firm*—Weingarten, Maxham & Schurgin

[57] ABSTRACT

A fluid laser having a flow channel between fluid inlet and active lasing region which reduces medium heating and resulting medium disturbances. The channel includes a thin optically transparent, thermally insulating layer directly bordering the medium. The thin layer rests upon a metallic heat sink, typically cooled, which receives and removes radiated energy from the active region, preventing it from heating the medium. The thin insulating layer permits the heat sink to be cooler than the medium without causing thermal effects in the medium. The more homogeneous medium resulting from such treatment contributes to better laser beam quality.

17 Claims, 3 Drawing Figures

FLUID LASER FLOW CHANNEL LINER

FIELD OF THE INVENTION

The present invention relates to laser flow channels, and in particular to the prevention of heating of flow channel walls and resulting laser medium inhomogeneity.

BACKGROUND OF THE INVENTION

The liquid dye laser is currently used as a source of laser excitation or amplification in applications of laser enrichment, such as is shown, for example, in U.S. Pat. No. 3,944,947. In such applications, there are at least three principal objectives for the laser oscillator or amplifier, namely high energy in each laser pulse, high repetition rate, and an output beam of laser radiation of high optical quality and low divergence. In these applications, output powers of several hundreds of watts at pulse rates of several hundreds of pulses per second in combination with an output beam as close to diffraction limited as possible are desired goals. One of the important advances in laser systems in achieving these objectives has been the transverse pump laser, as shown in U.S. Pat. No. 3,740,665, wherein the optical axis is transverse to the flow direction of the fluent laser material, typically a liquid dye solution. This permits a rapid replenishment of dye into the region of the optical axis to replace expended dye, increasing both power and repetition rate.

To some extent, both power and repetition rate can be augmented by increasing the level of applied excitation to the optical axis and by increasing the flow velocity of the fluent laser material. Excessive heating and breakdown in fluid dynamic flow characteristics are limiting factors here as well as turbulence due to heating effects. In addition, the variation in refractive index throughout the fluent laser material produced by temperature variations greatly degrade the beam quality.

One source of such temperature gradients and turbulence is the heating of flow channel walls upstream of the lasing area by absorption of stray fluorescent radiation produced by the lasing of the liquid dye. For flow channels in which the flow upstream of the laser region is not strictly laminar, temperature and the associated refractive index gradients generated as the liquid moves past the heated channel wall may appear in the laser region during subsequent pulses. This reduces laser output energy, which in turn increases the amount of fluorescence available to cause further channel wall heating, reducing the laser outputs still further.

SUMMARY OF THE INVENTION

The present invention includes a liquid dye laser having an area in which fluid flowing through the laser may be excited to produce laser radiation in the lasing area. Laminar flow of the lasing fluid upstream of the lasing area is enhanced by means of channel walls which are both transparent to the fluorescent radiation from the lasing fluid and thermally insulating. The effectiveness of these walls located upstream from the lasing area may be enhanced by backing them with a cooled heat sink.

DESCRIPTION OF THE DRAWING

These and other features of the present invention are more fully set forth below in the exemplary and nonlimiting detailed description of the preferred embodiment and in the accompanying figures, in which.

DETAILED DESCRIPTION OF THE INVENTION

In liquid, organic dye lasers, transverse pumping of the dye is required for high pulse repetition rate operation. Such pumping insures that for each subsequent pulse, a fresh, optically homogeneous laser medium is available. Optical gradients in the laser dye produced by the conversion into thermal energy of a part of the excitation energy are thereby swept out of the lasing region prior to the next pulse. However, the lasing of the liquid dye will produce small amounts of fluorescent energy which are not coupled out of the system as laser light. This energy can impinge upon the wall of the fluid channel upstream of the lasing areas and thereby heat these walls.

Figure 1:
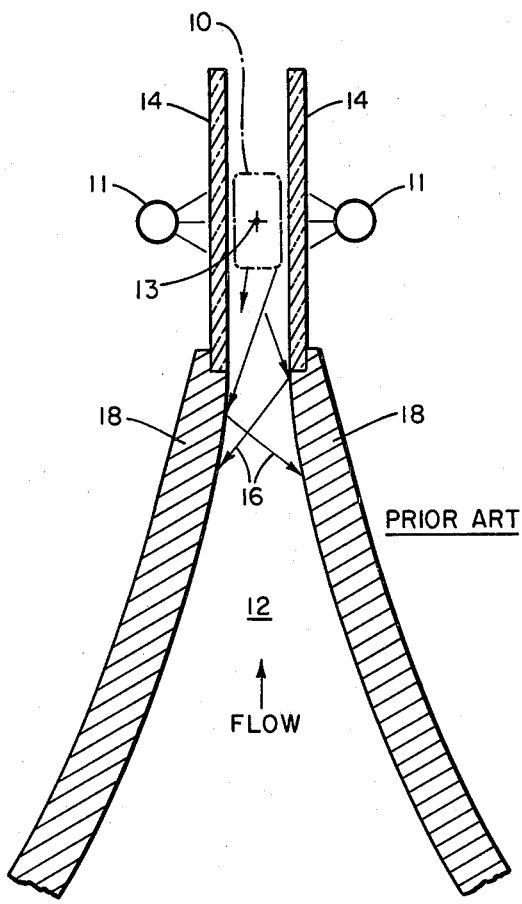
FIG. 1 shows a sectional view of a transverse flow laser dye channel illustrating the process by which heating of upstream walls occur in prior art lasers due to absorption of stray fluorescent radiation.

This may be seen by referring to FIG 1, which shows a cross-sectional drawing of a typical transverse-pumped dye laser flow channel. In FIG. 1, a lasing region 10 is located in a flow of a liquid dye lasing material 12. Transparent windows 14 allow the lasing area to be excited by means of energy introduced from an external source, such as flashlamps 11. During the period of lasing action, most of the energy in lasing region 10 is coupled out of the system as coherent laser radiation along an axis 13 transverse to the flow of the dye lasing liquid 12. However, a small amount of fluorescent energy is radiated from lasing region 10 in other directions. As shown diagrammatically by arrows 16, some of this energy may radiate in a direction upstream of lasing region 10 and impinge upon upstream channel walls 18. As described above, this stray loss energy causes channel walls 18 to increase in temperature and may result in undesirable heating of the fluid flow upstream of laser region 10.

It has been found that the problem of upstream heating of the flow channel walls may be substantially reduced by insulating the flow channel with a material which is transparent to the fluorescent radiation and which is thermally insulating. This allows the fluorescent radiation to pass through the transparent material to be absorbed on a cooler heat sink located behind the transparent material. Due to the presence of the thermally insulating material between the surface of the heat sink and the lasing medium, the temperature of the heat sink no longer needs to be critically matched to the temperature of the liquid dye lasing material.

Figure 2:
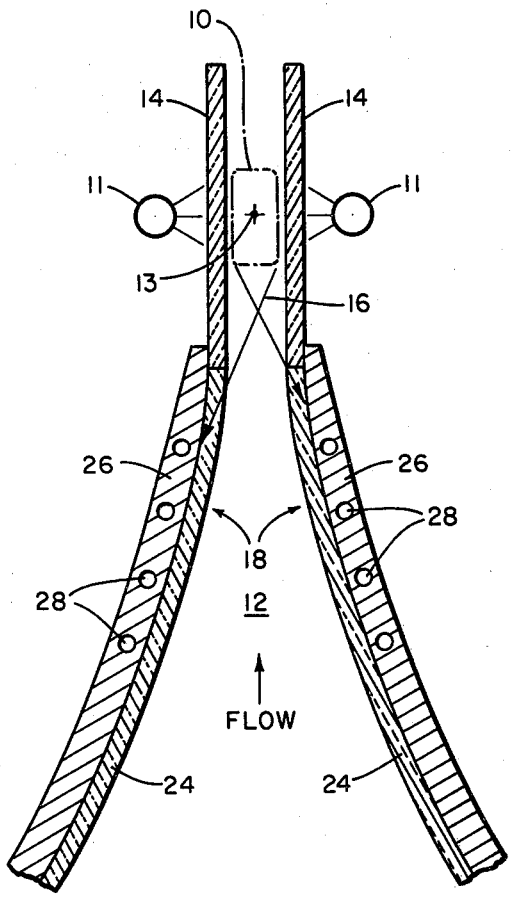
FIG. 2 shows a sectional view of such a laser having structure according to the present invention by which such heating is avoided.

Referring to FIG. 2, there is shown one exemplary embodiment of the present invention. In FIG. 2, a transverse-pumped, liquid dye laser, similar to that of FIG. 1, is shown, including a flow of liquid dye lasing material 12 through a lasing region 10 located between transparent windows 14. The upstream walls 18 of the flow channel are constructed in the following manner. Adjacent to and in contact with the liquid dye lasing material flowing through the channel are channel wall insulators 24 made of a material which is transparent or translucent to the frequencies at which fluorescent radiation 16 is produced by the liquid dye laser. Typical thicknesses are 0.5 mm. In addition to being transparent to the fluorescent radiation, it is desirable that channel wall insulators 24 be thermally insulating. Suitable materials include various plastics, including Teflon, and glass.

Immediately behind transparent wall insulators 24 are located heat sink walls 26 for absorbing the fluorescent radiation and conducting away heat created by this absorption. The efficiency of heat sink walls 26 may be increased by pumping a cooling fluid through ports 28 passing through heat sink walls 26.

As shown in FIG. 2, fluorescent radiation 16 produced by lasing action in lasing region 10 passes through transparent channel wall insulators 24 and impinges upon heat sink walls 26 where it is converted into thermal energy. This energy is conducted away by the heat sink and, if desired, by cooling fluid flowing through cooling ports 28. Due to the thermally insulating qualities of transparent channel wall 24, the temperature of heat sink walls 26 and the cooling fluid flowing through cooling ports 28 need not be precisely controlled. If heat sink walls 26 were in direct thermal contact with liquid dye lasing material 12, any temperature differential therebetween would produce an undesirable thermal gradient in the liquid dye material. It should be noted that the surface of wall insulator 24 and the junction between flow channel wall 24 and glass areas 14 should be as smooth and continuous as possible to avoid producing turbulence. A slowly converging channel width is also desired.

Figure 3:
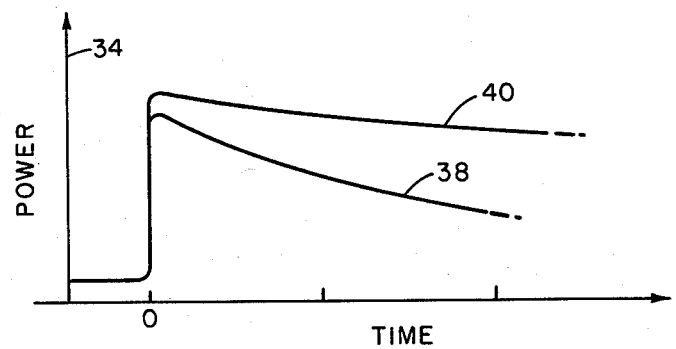
FIG. 3 is a graph showing the improvement in output power resulting from the present invention.

Referring to FIG. 3, there is shown a graph which demonstrates the effectiveness of the present invention. In this graph, Y-axis 34 represents relative laser output power, while X-axis 36 represents time. At time T=0, the lasing action in lasing area 10 is initiated. Curve 38 in FIG. 3 shows the relative laser output power produced by the flow channel construction of FIG. 1. As can be seen, the laser output power rapidly decays from an initial peak to a much lower value suggesting power losses from heat effects. Curve 40 shows the relative laser output power produced by a transverse pumped laser employing the present invention as shown in FIG. 2 in which the channel walls were lined with a clear plastic insulator having a thickness of 0.020 inches. As can be seen, the laser output power achieves a higher initial level and decays much more slowly than in curve 38.

The described system for increasing the power available from a transverse pumped fluid dye laser may be achieved with modifications to the specific structure described above. Accordingly, the invention is to be limited only as indicated in the following claims.

What is claimed is:

1. A fluid laser comprising:
a channel having a flow therethrough of a laseable fluid;
means for exciting the laseable fluid in said channel to cause laser radiation including fluorescent radiation to be produced in a region of said channel;
a conduit for the flow of said fluid upstream of said channel and having;
at least one cooled wall member;
means for thermally insulating said wall member from said flow in said conduit;
said insulating means being transmissive to said fluorescent radiation so that said fluorescent radiation passes through said insulating means to said cooled wall members thereby avoiding heating of said flow in said conduit.

2. The fluid laser of claim 1 wherein said lasing region extends transverse to said flow direction.

3. The liquid dye laser of claim 2 wherein said wall member includes means for conducting cooling fluid therethrough.

4. The fluid laser of claim 1 wherein said insulating means is formed at least partially of glass.

5. The fluid laser of claim 1 wherein said insulating means is formed at least partially of a plastic material transmissive to said fluorescent radiation.

6. The fluid laser of claim 5 wherein said insulating means is formed of Teflon.

7. The liquid dye laser of claim 1 wherein said channel defining means includes at least one optically transparent area, and means are provided for applying therethrough optical excitation to the lasing region.

8. The liquid dye laser of claim 7 wherein said optically transparent area and said insulating means are adjacent and cooperative to form a junction between said channel and said conduit, the boundary adjacent to said fluid flow between said optically transparent area and said insulating means having a surface bordering said channel which is smooth and continuous so as not to cause turbulence in said fluid flow.

9. A method of producing laser radiation, comprising the steps of:
conducting a flow of laseable fluid through a flow channel;
defining a lasing area in said channel;
causing laser radiation including fluorescence to be produced in a region of said channel;
absorbing fluorescence energy in a region of the fluid flow upstream of said channel;
thermally isolating fluid flow from the region of fluorescence absorption.

10. The method of claim 9 wherein said lasing region extends transverse to the flow.

11. The method of claim 10 comprising the step of cooling the region of fluorescence absorption.

12. The method of claim 9 further comprising the step of flowing a cooling liquid past the region of absorption.

13. The method of claim 9 wherein said step of insulating includes the step of impeding the flow of heat between said flow and region with insulation.

14. The method of claim 13 wherein said insulation comprises glass.

15. The method of claim 13 wherein said insulation is formed of a plastic transmissive to the fluorescent radiation.

16. The method of claim 13 wherein said insulation is formed of Teflon.

17. A fluid laser cell comprising:
a channel adapted to have a flow therethrough of a laseable fluid;
means for exciting the laseable fluid in said channel to cause laser radiation including fluorescent radiation to be produced in a region of said channel;
a conduit for the flow of said fluid upstream of said channel and having;
at least one cooled wall member;
means for thermally insulating said wall member from said flow in said conduit;
said insulating means being transmissive to said fluorescent radiation so that said fluorescent radiation passes through said insulating means to said cooled wall members thereby avoiding heating of said flow in said conduit.

* * * * *